UNITED STATES PATENT OFFICE.

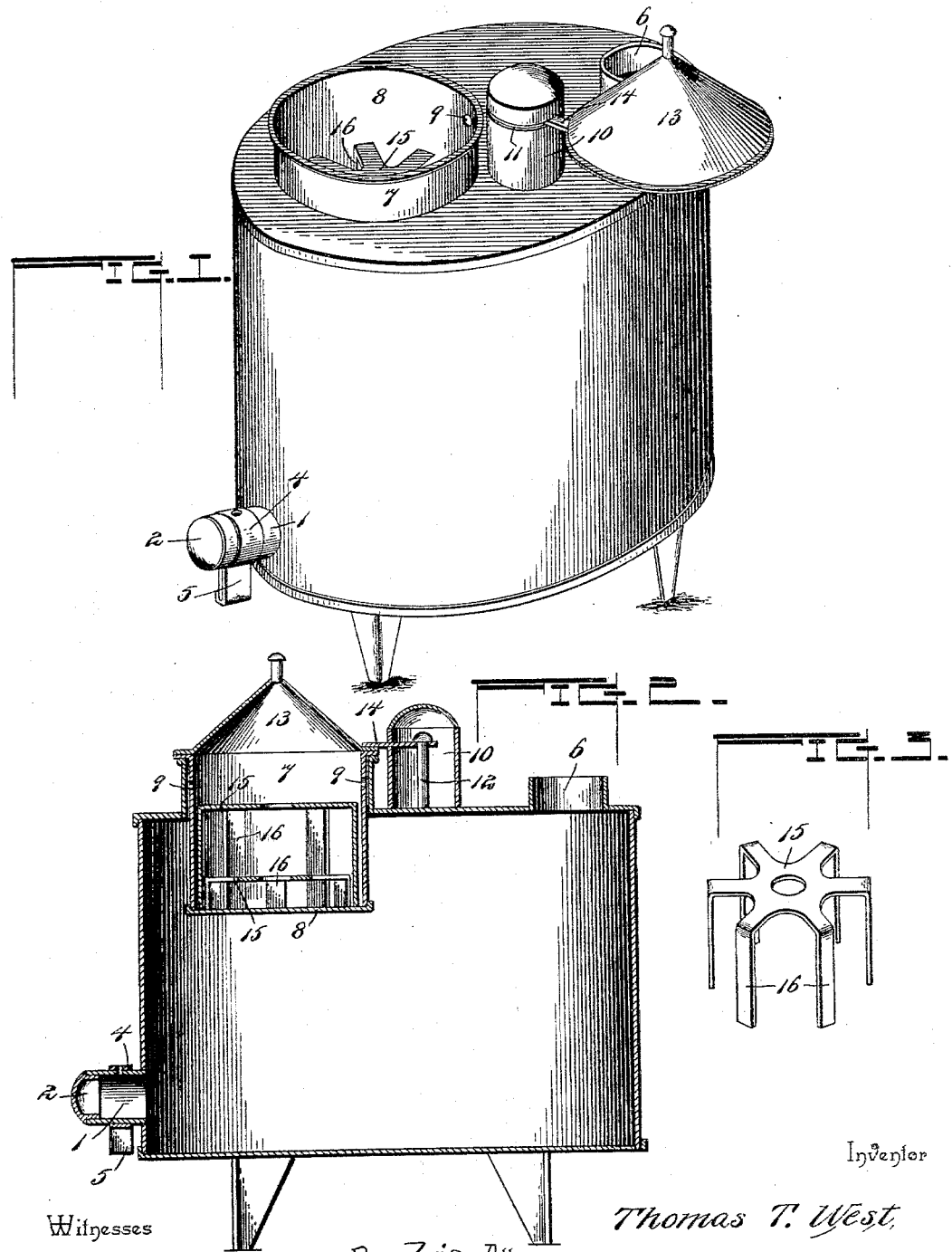

THOMAS T. WEST, OF SPRINGDALE, ARKANSAS, ASSIGNOR OF ONE-HALF TO MILLARD BERRY, OF SAME PLACE.

STOVE.

SPECIFICATION forming part of Letters Patent No. 593,144, dated November 2, 1897.

Application filed April 9, 1897. Serial No. 631,426. (No model.)

*To all whom it may concern:*

Be it known that I, THOMAS T. WEST, a citizen of the United States, residing at Springdale, in the county of Washington and State of Arkansas, have invented a new and useful Stove, of which the following is a specification.

In accordance with this invention an ordinary heating-stove is made capable of use for cooking or heating sad-irons by combining therewith a detachable pot provided with racks or shelves and a cover for closing either the pot or the opening in which the pot is suspended.

The improvement will be of any desired size, according to the capacity of the stove to which it is applied, and the form is immaterial so long as the objects in view are attained.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a stove of the wood-burning type having the invention applied thereto, the cover being turned aside. Fig. 2 is a vertical longitudinal section thereof. Fig. 3 is a detail view of a rack or shelf.

Corresponding and like parts are referred to in the following description and indicated in the several views of the drawings by the same reference-characters.

While the invention is designed to be applied to any form of heating-stove, it is shown in connection with a heater constructed, essentially, of sheet metal and designed for burning wood, fodder, and like fuel, the stove illustrated being of ordinary form and having at one side, near its lower end, an offstanding collar 1, closed by a cap 2 and having an opening closed by a ring damper 4, operated by means of an extension or finger-grip 5. The top of the heater has the ordinary stovepipe-collar 6 at one end and an opening at the opposite end encircled by a vertical rim 7, from which is suspended the pot 8, which has an outer flange at its upper end to extend over the rim 7. This pot fits loosely within the rim 7 and may be of any size and depth and has openings 9 in its sides at diametrically opposite points for the reception of a lifter when it is required to remove the pot from the stove, said openings being located near the upper end of the pot, and in addition to providing means for receiving the lifter they provide vents for the escape of steam and odor when cooking.

A tubular guide 10 is secured to the stove-top adjacent to the rim 7 and has a transverse slot 11 in its side about in the plane of the top edge of the rim 7, and this guide is closed at its upper end and houses a headed pin or stud 12, centrally disposed and secured to the heater. The cover 13 is of a size to close the open end of the rim 7, or the top of the pot 8 is provided with a tang 14 at one side, passing through and operating in the slot 11 and mounted upon the pin or stud 12. The combined action of the slot 11 and pin or stud 12 properly directs the cover in its horizontal movements and insures it passing over the rim or pot when brought into a normal position. The slot and tang are so disposed that the cover is limited in its movement when coming directly over the rim or pot. The head of the pin or stud extends over the tang and limits its upward movement, and the slot 11 is of a width to prevent vertical movement of the cover, which is essential when a close fit between the said cover and the rim or pot is desired.

The pot 8, which in effect is an oven, heater, or drum, is supplied with one or more shelves or racks detachably fitted therein and of varying height to enable different articles to be cooked at the same time. These shelves or racks are similarly formed and consist of a plate or rest 15 and supports 16. The rest and supports are integrally formed from a single piece of sheet metal cut so as to provide a series of radiating arms, which latter are bent between their ends about as shown, the spaces between the arms providing for the free circulation of the heat, as will be readily understood. When a series of shelves or racks are used, the supports of the upper one will pass between the spaces of the supports of the lower one, thereby enabling each rack or shelf to rest upon the bottom of the pot. The shelves or racks may be cast or formed of wire, if desired, but it is preferred to construct them of sheet metal, substantially as shown, for the sake of lightness and economy of manufacture.

Having thus described the invention, what is claimed as new is—

1. The combination with a stove or other form of heater having an opening in its top surrounded by a vertical rim, and a pot removably suspended within the rim, of a tubular guide secured to the stove-top adjacent to the rim and having a transverse slot in its side, a pin or stud located within the tubular guide, and a cover having a tang mounted upon the said pin or stud and operating in the slot of the tubular guide, substantially as shown for the purpose set forth.

2. In a stove or heater having an opening in its top surrounded by a vertical rim, the combination of a pot removably suspended within the said rim, a tubular guide closed at its upper end and secured at its lower end to the stove-top adjacent to the vertical rim, and having a transverse slot in its side, a headed pin or stud secured centrally within the tubular guide, and a cover having a tang mounted upon the headed pin or stud and operating in the transverse slot of the tubular guide, substantially in the manner set forth for the purpose described.

3. In a stove or heater, the combination with a heating-pot, of a series of racks or shelves each constructed of sheet metal comprising radiating arms which are bent intermediate of their ends, forming supports and a rest, the latter having depressions around its edge corresponding to the spaces between the said supports and formed by bending the aforesaid arms at an intermediate point, the said depressions receiving the supports of the upper shelf, whereby the series of shelves are supported upon the bottom of the heater, substantially as set forth.

In testimony that I claim the foregoing as my own I have hereto affixed my signature in the presence of two witnesses.

THOMAS T. WEST.

Witnesses:
W. E. BRUFFEY,
W. A. GRAVES.